(12) United States Patent
Breitfeld et al.

(10) Patent No.: US 8,147,368 B2
(45) Date of Patent: Apr. 3, 2012

(54) SEAT ADJUSTMENT DEVICE FOR A VEHICLE SEAT

(75) Inventors: Uwe Breitfeld, Düsseldorf (DE); Frank Triebeneck, Nurtingen (DE)

(73) Assignee: Johnson Controls GmbH, Burscheid (DE)

( * ) Notice: Subject to any disclaimer, the term of this patent is extended or adjusted under 35 U.S.C. 154(b) by 517 days.

(21) Appl. No.: 12/440,436

(22) PCT Filed: Aug. 30, 2007

(86) PCT No.: PCT/EP2007/007578
§ 371 (c)(1),
(2), (4) Date: Mar. 6, 2009

(87) PCT Pub. No.: WO2008/028591
PCT Pub. Date: Mar. 13, 2008

(65) Prior Publication Data
US 2009/0230753 A1    Sep. 17, 2009

(30) Foreign Application Priority Data
Sep. 8, 2006 (DE) .......................... 10 2006 042 273

(51) Int. Cl.
*F16H 48/06* (2006.01)

(52) U.S. Cl. ....................................................... 475/149
(58) Field of Classification Search ................... 475/149
See application file for complete search history.

(56) References Cited

U.S. PATENT DOCUMENTS

| 6,543,850 | B1 * | 4/2003 | Becker et al. ................. 297/362 |
| 7,041,024 | B2 * | 5/2006 | Becker et al. ................. 475/162 |
| 7,677,665 | B2 * | 3/2010 | Eppert et al. ............. 297/362.11 |
| 7,726,744 | B2 * | 6/2010 | Schuler .................... 297/362.11 |
| 7,878,593 | B2 * | 2/2011 | Nae ................. 297/362 |
| 2007/0029893 | A1 * | 2/2007 | Schuler et al. ................ 310/239 |
| 2011/0169313 | A1 * | 7/2011 | Schulz et al. ................. 297/362 |

FOREIGN PATENT DOCUMENTS

| DE | 3519058 A1 * | 12/1986 |
| DE | 10309083 A1 * | 9/2004 |
| EP | 0681359 A | 11/1995 |

* cited by examiner

*Primary Examiner* — Dirk Wright
(74) *Attorney, Agent, or Firm* — Butzel Long

(57) ABSTRACT

A seat adjustment device for a vehicle seat includes a driving motor that is in engagement with a driving part of a self-locking free wheel. An output part of the free wheel is connected to a gearing. To obtain a compact structure, the driving motor, the free wheel and the gearing are located in a common housing, which preferably has a housing base part and at least one housing covering.

16 Claims, 2 Drawing Sheets

SEAT ADJUSTMENT DEVICE FOR A VEHICLE SEAT

CROSS REFERENCE TO RELATED APPLICATIONS

The present application is U.S. National Stage filing of International Application No. PCT/EP2007/007578, filed on Aug. 30, 2007, titled "SEAT ADJUSTMENT DEVICE FOR A VEHICLE SEAT" which claims priority to German Patent Application No. DE 10 2006 042 273.2 filed Sep. 8, 2006, and the entire disclosures of which are incorporated herein by reference.

The disclosure involves a seat adjustment device for a vehicle seat with a driving motor for engaging a driving part of a self-locking free wheel; the output part of the free wheel is connected to a gearing.

BACKGROUND

Vehicle seats, especially in motor vehicles, can be adjusted in many different ways, for instance with regard to their height, their tilt etc., to achieve an adaptation in this way to the physical circumstances of the user. In most cases, an electrically driven seat adjustment device is used that has an electric driving motor, its output shaft is coupled to a driving part of a self-locking free wheel. Both a self-locking worm screw and a mechanical sprag free wheel is known as self-locking free wheels.

The drive movement is transferred to an output part of the free wheel when a driving force is applied to the driving part of the self-locking free wheel by the driving motor. When a driving force acts upon the output part of the free wheel, in contrast, the self-locking free wheel locks up, and no movement comes about at its driving part.

The output part of the self-locking free wheel is connected to a gearing with which a conversion of the output movement is done in the desired way. The output side of the gearing is connected to the part of the vehicle seat that is to be adjusted.

A gearing housing with an integrated self-locking worm screw is provided in a known seat adjustment device. A commercial electric motor that projects laterally from the gearing housing is flangemounted to the gearing housing. The disadvantage that the seat adjustment device requires a relatively large installation space and that high assembly expenses are necessary for the attachment of the electric motor is associated with this structure.

The invention is based on the problem of creating a seat adjustment device of the above-mentioned type that only requires slight assembly expenses and that has a compact structure.

SUMMARY

In one exemplary embodiment, a seat adjustment device includes a driving motor, a self-locking free wheel and a gearing to be located in a common housing. A very compact, self-contained modular unit is provided that can be completely pre-assembled without requiring the subsequent attachment of an electric motor.

In one particular exemplary embodiment, there can be provisions for the housing to have a housing base part and at least one housing covering, wherein the driving motor, the free wheel and the gearing are supported on the housing base part.

The housing base part, which is preferably designed as a housing block provided with recesses and through-holes, is preferably provided with one housing covering in each case from two opposing sides, wherein appropriate holes or fixtures are preferably created in at least one of the housing coverings so that the seat adjustment device can be mounted in its installation location.

In one exemplary embodiment a brushless electric motor that has a very compact, flat structure and that can be completely embedded in the housing base part as the driving motor is provided.

The driving motor is preferably located in an end area of the housing and is in engagement with the free wheel, which is located in the central area of the housing. A mechanical sprag free wheel is preferably used as a free wheel.

The gearing is arranged on the side of the free wheel that is turned away from the driving motor in the housing base part. The gearing is preferably designed as a spur gearing or a planetary gear system to achieve a very compact structure. Very good, short force transmission is ensured because of the series arrangement of the driving motor, the free wheel and the gearing.

In another exemplary embodiment, an electronic control unit can be provided for the driving motor. The electronic control unit for the driving motor to can be integrated into the housing.

BRIEF DESCRIPTION OF THE DRAWINGS

Further details and features of the disclosure are apparent from the following description of an exemplary embodiment with reference to the drawing. The following views are shown.

DETAILED DESCRIPTION

Figure 1:
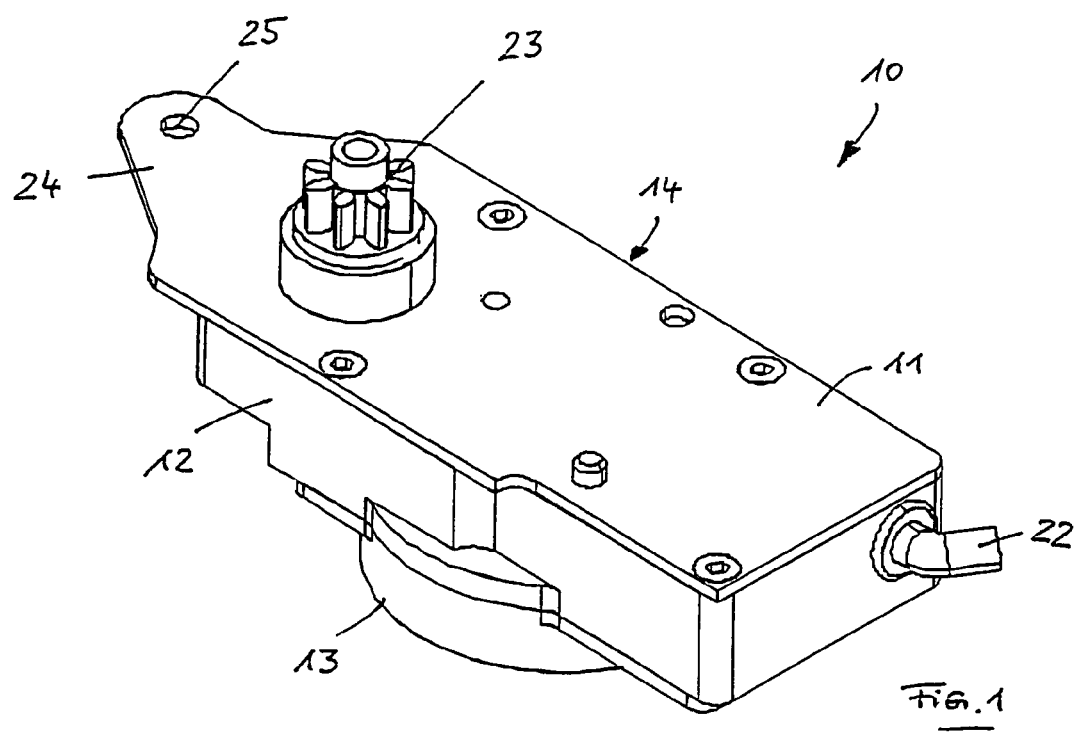
FIG. 1 shows a perspective view of the front of the seat adjustment device.
Figure 2:
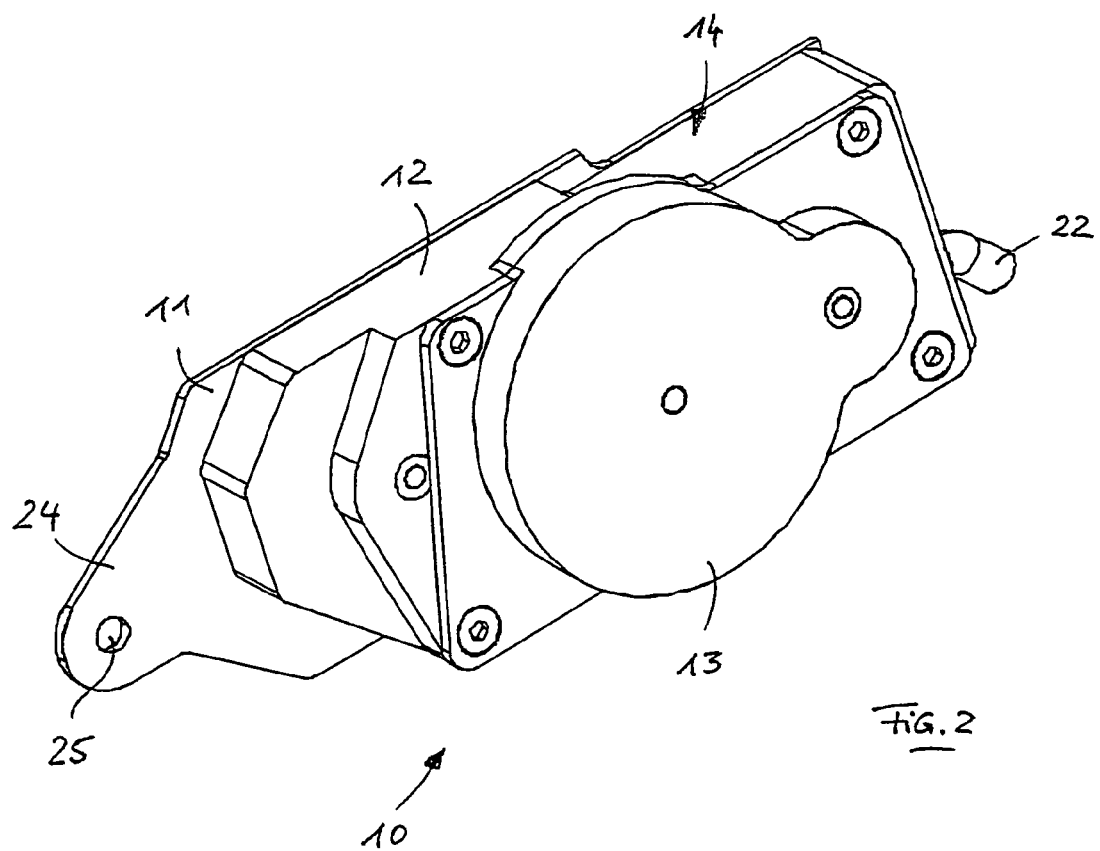
FIG. 2 shows a perspective view of the back of the seat adjustment device.
Figure 3:
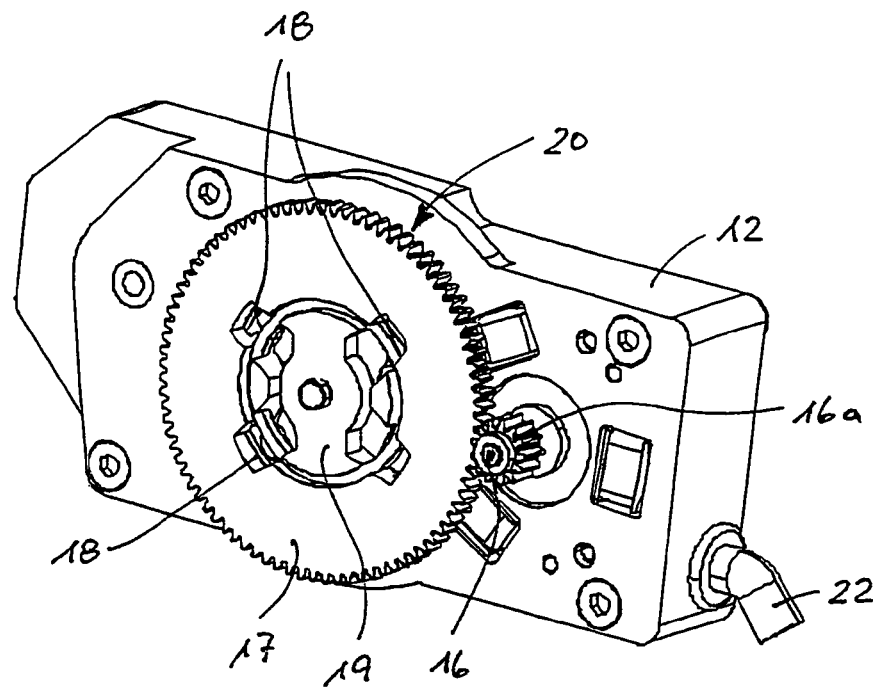
FIG. 3 shows a perspective view of the back of the seat adjustment device with a housing covering that has been removed.

A seat adjustment device 10 shown in FIGS. 1 to 4 for a vehicle seat that is not shown has a housing 14 that is comprised of an intermediate, block-type housing base part 12 and two housing coverings 11 and 13 put onto the housing base part 12 from different sides. The housing covering 11 has a formed flange 24 with at least one hole 25 to which the seat adjustment device 10 can be fastened at its installation location.

Figure 4:
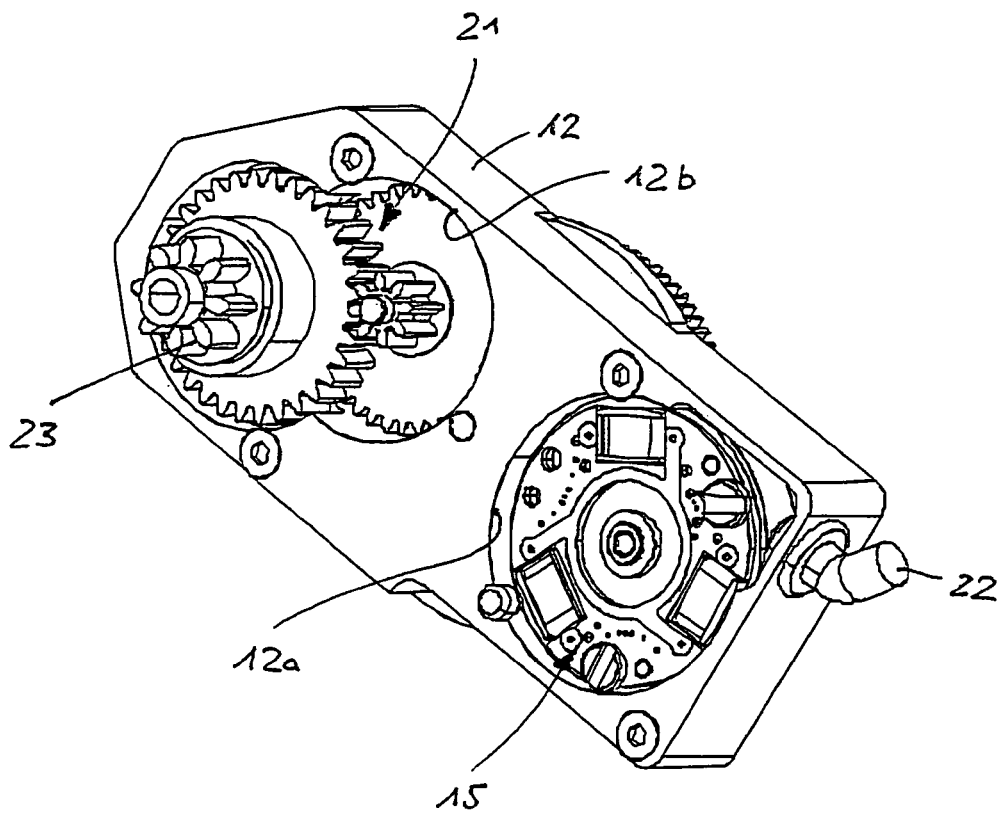
FIG. 4 shows a perspective view of the front of the seat adjustment device with a housing covering that has been removed.

As FIG. 4 shows, in particular, the housing base part 12 has a recess 12a on the front in the lateral end area into which a driving motor 15 is integrated in the form of a brushless electric motor that is supplied with electrical energy via a connecting cable 22 leading out from the end of the housing base part 12. An output shaft 16 of the driving motor 15 juts out on the back of the housing base part 12 and supports a pinion 16a (see FIG. 3).

A self-locking free wheel 20 in the form of a mechanical sprag free wheel is provided in the central area on the back of the housing base part 12. It is comprised of a driving part in the form of a drive gear 17 that meshes with the pinion 16a of the output shaft 16 of the driving motor 15. The drive gear 17 is designed with a ring shape and surrounds an output part 19, wherein a self-locking clamping fixture 18 with a structure that is known per se is arranged between the drive gear 17 and the output part 19. When a rotary movement is transferred from the driving motor 15 to the drive gear 17, the clamping fixture 18 acts as a follower, so the rotary movement is directly transferred to the output part 19. If, in contrast, a load is applied to the vehicle seat by a user of the vehicle seat, this acts as a driving force on the output part 19. In that case, the clamping fixture 18 locks up, whereby the output part 19 is stopped from rotating, so no undesired adjustment movements arise in the vehicle seat.

In the interior of the housing base part 12, the output part 19 of the free wheel 20 is in engagement in a way that is not shown with a downstream gearing 21 in the form of a spur gearing or planetary gear system. The gearing 21 is seated in a further recess 12b, configured on the front of the housing base part 12, which is implemented on the end of the housing base part 12 that is turned away from the driving motor 15. An output pinion 23 of the gearing 21 can be indirectly or directly connected to the adjusting section of the vehicle seat.

A very compact, space-saving structure exists because of the use of the single block-type housing base part 12 and the arrangement of the driving motor 15 and the gearing 21 on the one side of the housing base part 12 in its respective end areas and the arrangement of the self-locking free wheel 20 in the central area of the opposite side of the housing base part 12.

If desired, an electronic control unit can be provided for the driving motor 15 that can be integrated into the housing base part 12 and that will preferably be seated in a recess of the housing base part 12 that is configured on the front side.

What is claimed is:

1. A seat adjusting device for a vehicle seat, the seat adjusting device comprising:
a drive motor which engages with a driving part of a self-inhibiting freewheel having an output part is connected to a seat adjustment gear, wherein the drive motor, the freewheel and the seat adjustment gear are arranged in a common housing having a housing cover and a housing base part, wherein the base part includes an interior recess and the drive motor is disposed within the housing base part recess, the freewheel is arranged on one side of the housing base section and the seat adjustment gear is arranged on an opposed side of the housing base section.

2. The seat adjusting device of claim 1, wherein the driving motor is a brushless electric motor.

3. The seat adjusting device of claim 1, wherein the free wheel is a mechanical clamping freewheel.

4. The seat adjusting device of claim 1, wherein the seat adjustment gear is a spur gear.

5. The seat adjusting device of claim 1, wherein the seat adjustment-gear is a planetary gear.

6. The seat adjusting device of claim 1, further comprising an electronic control system coupled to the drive motor wherein the electronic control system is disposed within inter recess of the housing base part.

7. The seat adjusting device of claim 6, wherein the electronic control system is positioned within a recess on the front side of the housing base section.

8. The seat adjusting device of claim 1, wherein the housing cover is secured to the housing base part to cover the freewheel.

9. The seat adjusting device of claim 1, wherein the drive motor is disposed within a recess located in a lateral end area of the housing base section front side.

10. The seat adjusting device of claim 1, wherein the drive motor includes an output shaft that supports a pinion and extends outwardly from the rear side of the housing base section.

11. The seat adjusting device of claim 1, wherein the freewheel is a mechanical clamping freewheel having a drive gear that meshes with a pinion of an output shaft of the drive motor.

12. The seat adjusting device of claim 11, further comprising a self-locking clamping fixture arranged between the drive gear and the output part, wherein as rotary movement is transferred from the drive motor to the drive gear, the clamping fixture acts as a follower and transfers the rotary movement to an output part connected to a seat adjuster and application of a load to the vehicle seat locks the clamping fixture to stop rotation of the output part and prevent adjustment of the vehicle seat by the seat adjustment gear.

13. A seat adjusting device for a vehicle seat, the seat adjusting device comprising:
a drive motor having a drive shaft;
a self-locking freewheel having a driving part that engages the drive shaft to transit rotary movement of the drive shaft to the self-locking freewheel and a locking part that prevents rotary movement of the self-locking freewheel;
an electronic control system coupled to the drive motor;
a housing having a housing cover and a housing base part, wherein the base part includes an interior recess and the drive motor is disposed within the housing base part recess, the freewheel is arranged on one side of the housing base section and an adjustment gear is arranged on an opposed side of the housing base section.

14. The seat adjusting device of claim 13, wherein the self-locking freewheel is a mechanical clamping freewheel having a drive gear that meshes with a pinion of an output shaft of the drive motor.

15. The seat adjusting device of claim 14, wherein the self-locking clamping fixture is arranged between the drive gear and the output part, and as rotary movement is transferred from the drive motor to the drive gear, the clamping fixture acts as a follower and transfers the rotary movement to the output part and application of a load to the vehicle seat locks the clamping fixture to stop rotation of the output part and prevent adjustment of the vehicle seat.

16. A seat adjusting device for a vehicle seat, the seat adjusting device comprising:
a drive motor having an output shaft;
a self-locking freewheel having a drive gear that engages the output shaft of the drive motor and an output part that is connected to a vehicle seat adjustment gear;
a clamping fixture arranged between the drive gear and the output part, wherein as rotary movement is transferred from the drive motor to the drive gear, the clamping fixture acts as a follower and transfers the rotary movement to the output part to adjust the seat and application of a load to the vehicle seat locks the clamping fixture to stop rotation of the output part and prevent adjustment of the vehicle seat;
an electronic control system coupled to the drive motor; and
a housing having a cover part and a base part, wherein the base part includes an interior recess and the drive motor is disposed within the housing base part recess, the freewheel is arranged on one side of the housing base section and the adjustment gear is arranged on an opposed side of the housing base section.

* * * * *